(12) United States Patent
Yamaguchi

(10) Patent No.: US 10,579,455 B2
(45) Date of Patent: Mar. 3, 2020

(54) IMAGE FORMING APPARATUS AND METHOD FOR CONTROLLING IMAGE FORMING APPARATUS

(71) Applicant: KYOCERA Document Solutions Inc., Osaka (JP)

(72) Inventor: Hirofumi Yamaguchi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/277,463

(22) Filed: Feb. 15, 2019

(65) Prior Publication Data

US 2019/0278652 A1 Sep. 12, 2019

(30) Foreign Application Priority Data

Mar. 12, 2018 (JP) .................................. 2018-044029

(51) Int. Cl.
| | |
|---|---|
| *G06K 15/00* | (2006.01) |
| *G06F 11/30* | (2006.01) |
| *G06F 11/07* | (2006.01) |
| *H04N 1/00* | (2006.01) |
| *G06F 3/12* | (2006.01) |

(52) U.S. Cl.
CPC ...... *G06F 11/0757* (2013.01); *G06F 11/0733* (2013.01); *G06F 11/0787* (2013.01); *G06K 15/408* (2013.01); *H04N 1/00888* (2013.01); *H04N 2201/0094* (2013.01)

(58) Field of Classification Search
CPC ....... H04N 1/00888; H04N 2201/0094; G06K 15/408; G06F 11/0787; G06F 11/0733; G06F 11/0757; G06F 3/1221; G06F 3/1229
USPC ........ 358/1.11–1.18; 714/51, 55, 49, 15, 30; 713/502
See application file for complete search history.

(56) References Cited

U.S. PATENT DOCUMENTS

| | | | | |
|---|---|---|---|---|
| 6,490,692 B1* | 12/2002 | Nomura | ................. | G03G 15/55 714/15 |
| 2005/0114732 A1* | 5/2005 | Janin | ................... | G06F 11/0757 714/30 |
| 2011/0231712 A1* | 9/2011 | Hirata | ................. | G06F 11/0778 714/49 |
| 2016/0357623 A1* | 12/2016 | Oishi | ................... | G06F 11/0757 |
| 2017/0220419 A1* | 8/2017 | Kuo | ..................... | G06F 11/1417 |

FOREIGN PATENT DOCUMENTS

JP H 6-35737 A 2/1994

* cited by examiner

*Primary Examiner* — Chad Dickerson
(74) *Attorney, Agent, or Firm* — Stein IP, LLC

(57) ABSTRACT

When a watchdog reset request is input, a power supply controller performs partial reset processing (resetting of a control circuit alone). When restarted by partial reset processing, the control circuit makes a non-volatile memory store a log of the stored contents of a volatile memory. After the log is stored, the control circuit transmits a system reset request to the power supply controller. Based on the system reset request, the power supply controller resets the control circuit, the non-volatile memory, the volatile memory, and reset targets.

9 Claims, 6 Drawing Sheets

IMAGE FORMING APPARATUS AND METHOD FOR CONTROLLING IMAGE FORMING APPARATUS

INCORPORATION BY REFERENCE

This application is based upon and claims the benefit of priority from the corresponding Japanese Patent Application No. 2018-044029 filed on Mar. 12, 2018, the contents of which are hereby incorporated by reference.

BACKGROUND

The present disclosure relates to an image forming apparatus which collects a log on occurrence of a fault.

There are systems that include a microprocessor. The microprocessor may stop due to noise or a defect in software. When the microprocessor stops, the entire system may stop. The stopped system may be recovered automatically using a watchdog timer. Of a recovery system using the watchdog timer, one example as described below is known.

Specifically, an automatic fault recovery system that performs error history recording processing is described which, by using a microprocessor, detects a runaway in the system using a watchdog timer to initialize the system, records an operation history of software, detects that the watchdog timer has operated based on a watchdog timer flag, divides software in function blocks to control the operation, detects that error processing has been performed based on a restart flag, records an error history of the system, refers to the watchdog timer flag when a hardware reset occurs, sets the restart flag to perform the process immediately before the reset if the reset is based on the watchdog timer, detaches from the system the process immediately before the reset if, after restarting, the watchdog timer operates again, records the detached process name and then moves to normal operation, records that an error has occurred due to an external disturbance and then moves to normal operation if the process finishes without operation of the watchdog timer. With this configuration, when a runaway occurs in the system, the location of a fault is detected to be recorded, and restarting is tried by detaching the location of the fault.

In the microprocessor, a fault (freeze, lock, runaway) may occur. In a fault state, for example, processing and signal transmission and reception stop. Or, the apparatus including the microprocessor stops responding. The cause of a fault varies. A fault may occur due to a bug included in software. A fault may occur due to an external factor such as noise. The cause may be the processing that precedes the processing during which a fault has occurred.

When a detailed operation history (the processing status at a stop) can be checked, it will help to find the cause of a fault. Here, based on a program or data read to a RAM, the microprocessor may perform processing. When the stored contents in the RAM connected to the microprocessor can be checked, the status during a fault or the cause of a fault may be found. However, in a state where the microprocessor is stopped, it is not possible to read data from the RAM. Inconveniently, it is then impossible, even When attempted, to record the stored contents in the RAM.

With the known technology mentioned above, it is possible only to judge whether the cause of a fault is due to software or an external disturbance (noise). Also, software is divided into function blocks. The process controller operates such that the process immediately before the reset (software block) is performed. The incidence of a fault is not necessarily 100%. If, execution of the process immediately before the reset after restarting proceeds without a problem, the wrong cause of a fault is recorded. Also, When the cause is in a process preceding the process immediately before the reset, the cause cannot be found. With the known technology mentioned above, it is difficult to find the cause of a fault correctly.

SUMMARY

An image forming apparatus according to the present disclosure includes a printing unit, a watchdog timer, a control circuit, a non-volatile memory, a volatile memory, and a power supply controller. The printing unit performs printing. When an initialization signal for initialization is input in a prescribed period, the watchdog timer resets a timer. When the initialization signal is not input in the prescribed period, the watchdog timer outputs a watchdog reset request. The control circuit inputs the initialization signal to the watchdog timer. The non-volatile memory stores a program. To the volatile memory, the program is read. The power supply controller controls the supply of electric power to the control circuit, the non-volatile memory, the volatile memory, and reset targets. The power supply controller, for restarting, resets the control circuit, the non-volatile memory, the volatile memory, and the reset targets. The power supply controller is connected to the watchdog timer. When the watchdog reset request is input, the power supply controller performs partial reset processing in which the control circuit alone is reset. When the control circuit is restarted by the partial reset processing, the control circuit makes the non-volatile memory store a log of stored contents of the volatile memory. After the log is stored, the control circuit transmits a system reset request to the power supply controller. When the power supply controller receives the system reset request, the power supply controller resets the control circuit, the non-volatile memory, the volatile memory, and the reset targets.

This and other objects of the present disclosure, and the specific benefits obtained according to the present disclosure, will become apparent from the description of embodiments which follows.

DETAILED DESCRIPTION

The purpose of the present disclosure is to store a log of the contents of a memory when a fault occurs in a control circuit, thereby to facilitate fault cause analysis. Hereinafter, with reference to FIGS. 1 to 7, one example of an image forming apparatus according to an embodiment of the present disclosure will be described. A multifunction peripheral 100 will be taken as an example of the image forming apparatus. It should however be noted that all the features described in connection with the embodiment in terms of structures, arrangements, and the like are merely examples and are not meant to limit the scope of the disclosure.

<Multifunction Peripheral 100>

Figure 1:
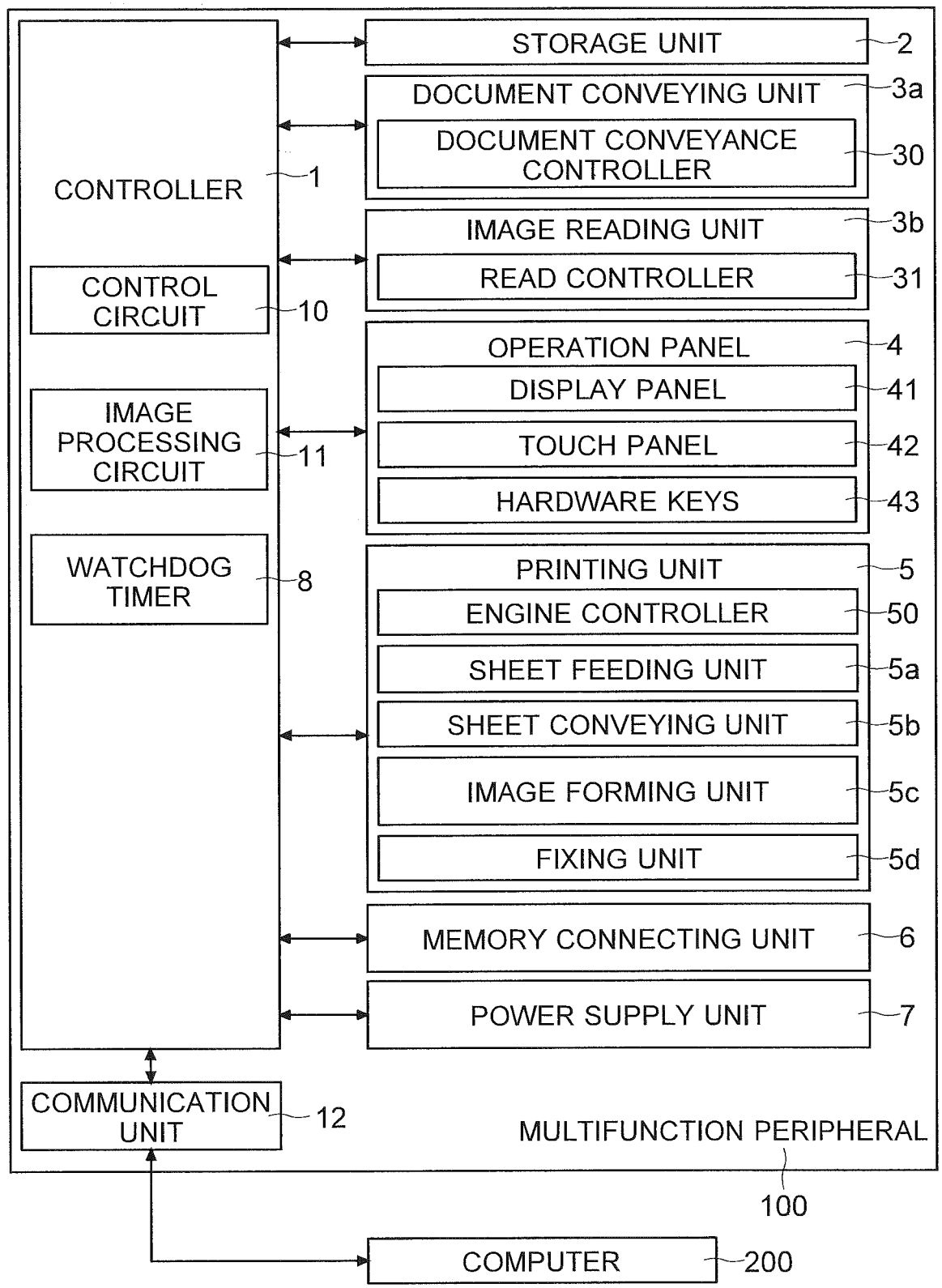
FIG. 1 is a diagram showing one example of a multifunction peripheral according to an embodiment.

With reference to FIG. 1, the multifunction peripheral 100 according to the embodiment will be described. As shown in FIG. 1, the multifunction peripheral 100 includes a controller 1, a storage unit 2, a document conveying unit 3a, an image reading unit 3b, an operation panel 4, a printing unit 5, a memory connecting unit 6, and a power supply unit 7.

The controller 1 controls the operation of the multifunction peripheral 100. The controller 1 includes a control circuit 10, a watchdog timer 8, and an image processing circuit 11. The control circuit 10 is, for example, a CPU. The watchdog timer 8 may be provided in the control circuit 10. In other words, the control circuit 10 may be a CPU having a watchdog timer function.

The image processing circuit 11 performs image processing for generating image data for printing. The storage unit 2 stores programs and data needed for operation and control of the multifunction peripheral 100. The storage unit 2 includes a non-volatile memory 21 and a volatile memory 22 (see FIG. 4). The non-volatile memory 21 is, for example, a flash ROM. The non-volatile memory 21 may include a HDD. The volatile memory 22 is, for example, a RAM.

When a job of reading a document is performed, the controller 1 makes the document conveying unit 3a convey a set document. In the document conveying unit 3a, a document comprising a plurality of sheets can be set. When a document is set in the document conveying unit 3a, the controller 1 makes the document conveying unit 3a convey the document one sheet after another toward a reading position (a contact glass for conveyed-document reading, unillustrated). The controller 1 makes the image reading unit 3b read the document conveyed by the document conveying unit 3a. When a document is set on a contact glass for placed-document reading (unillustrated), the controller 1 makes the image reading unit 3b read the document set on the contact glass for placed-document reading. The image reading unit 3b generates image data of the read document.

The operation panel 4 includes a display panel 41, a touch panel 42, and hardware keys 43. The controller 1 controls display on the display panel 41. The controller 1 displays operation images on a screen. The operation images include, for example, software keys, buttons, tabs, and check boxes. Based on the output from the touch panel 42, the controller 1 recognizes operated operation images. The controller 1 recognizes operated hardware key 43.

The printing unit 5 includes a sheet feeding unit 5a, a sheet conveying unit 5b, an image forming unit 5c, and a fixing unit 5d. When a job involving printing is performed, the controller 1 makes the sheet feeding unit 5a feed a sheet. The controller 1 makes the sheet conveying unit 5b convey the sheet along the conveying passage in the apparatus. The controller 1 makes the image forming unit 5c form a toner image based on image data of an image to be formed. The controller 1 makes the fixing unit 5d fix the transferred toner image to the sheet.

A portable storage device can be connected to the memory connecting unit 6. In other words, the memory connecting unit 6 is an interface with a memory. The portable storage device is, for example, a non-volatile semiconductor memory such as a USB memory or a memory card. The memory connecting unit 6 includes a circuit and a socket for communicating with a connected portable storage device. The controller 1 can read from and write to the portable storage device via the memory connecting unit 6.

The power supply unit 7 supplies electric power to different parts of the multifunction peripheral 100 (the controller 1, the storage unit 2, the document conveying unit 3a, the image reading unit 3b, the operation panel 4, the printing unit 5, and the memory connecting unit 6). The communication unit 12 includes a communication circuit and a communication memory. The communication memory stores communication software and data to be communicated. The communication unit 12 can communicate with a computer 200. The communication unit 12 receives printing data transmitted from the computer 200. Printing data is image data and data written in a page description language. Based on received printing data, the controller 1 makes the printing unit 5 perform printing (a printing job). It can also transmit image data from the communication unit 12 toward an external computer 200 (a transmitting job).

<Electric Power Supply System>

Figure 2:
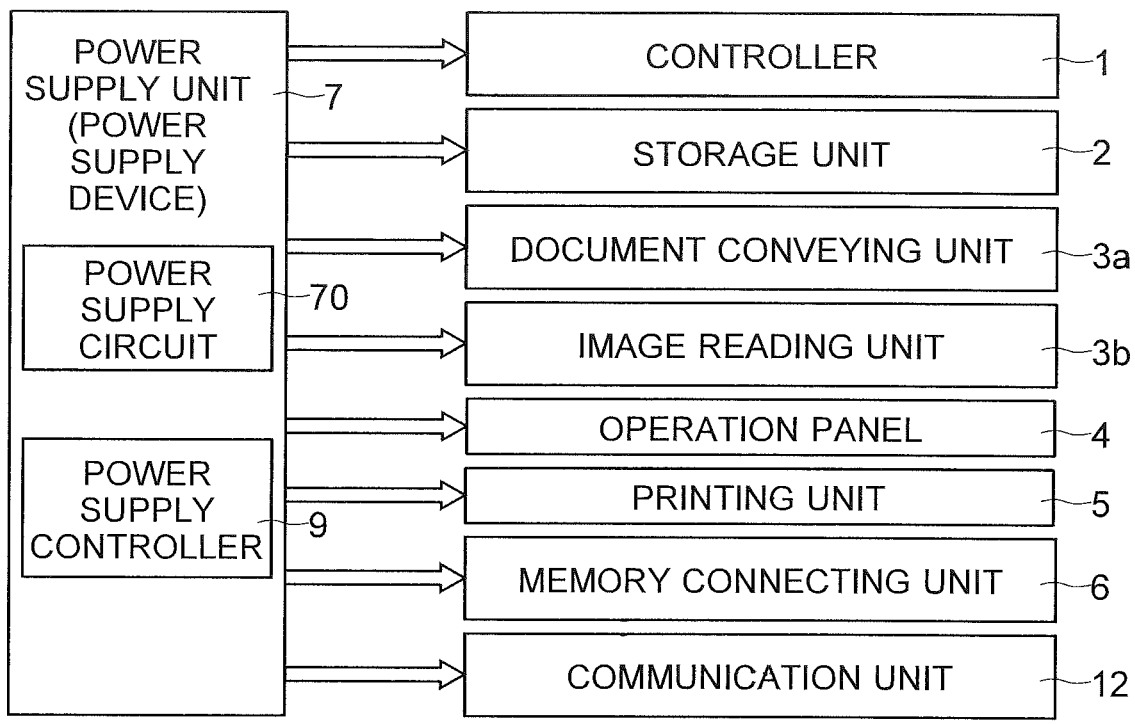
FIG. 2 is a diagram showing one example of an electric power supply system in the multifunction peripheral according to the embodiment.

Next, with reference to FIGS. 2 and 3, one example of an electric power supply system in the multifunction peripheral 100 according to the embodiment will be described. The multifunction peripheral 100 includes the power supply unit 7 (power supply device). The power supply unit 7 includes a power supply circuit 70 and a power supply controller 9. The power supply circuit 70 converts electric power supplied from a commercial power supply. For example, the power supply circuit 70 converts alternating-current electric power to direct-current electric power. The power supply circuit 70 generates a plurality of kinds of voltages. Accordingly, the power supply circuit 70 includes a plurality of power conversion circuits. For example, the power supply circuit 70 includes a switching power supply including a transformer, a DC converter, and a regulator. The power conversion circuits output predetermined voltages.

The power supply unit 7 supplies electric power to the controller 1, the storage unit 2, the document conveying unit 3a, the image reading unit 3b, the operation panel 4, the printing unit 5, the memory connecting unit 6, and the communication unit 12. The power supply unit 7 supplies voltages needed for operation to different portions. The power supply controller 9 controls the supply of electric power to different portions. The power supply controller 9 can supply or stop supplying electric power on a portion-by-portion basis. The power supply controller 9 can supply electric power to all those portions, or supply electric power to some and stop supplying it to other.

<Normal Mode and Power Saving Mode>

Next, with reference to FIGS. 3 and 4, one example of a normal mode and a power saving mode in the multifunction peripheral 100 according to the embodiment will be described. As shown in FIG. 3, the multifunction peripheral 100 includes a main power switch 101. When main power is turned on by the main power switch 101, the power supply controller 9 starts to supply electric power to all the portions (the controller 1, the storage unit 2, the document conveying unit 3a, the image reading unit 3b, the operation panel 4, the printing unit 5, the memory connecting unit 6, and the communication unit 12).

The power supply controller 9 resets the control circuit 10, the non-volatile memory 21, the volatile memory 22, and reset targets. The circuit that has been reset begins starting up. For example, the reset targets include the image processing circuit 11, a document conveyance controller 30, a read controller 31, an engine controller 50, the memory connecting unit 6, and the communication unit 12 (see FIGS. 1 and 4). The watchdog timer 8 is not included in the reset targets. The watchdog timer 8 starts operating when it receives a request to start counting from the control circuit 10.

The document conveyance controller 30 is provided in the document conveying unit 3a. The document conveyance controller 30 is a circuit board for controlling the operation of the document conveying device based on an instruction from the controller 1. The read controller 31 is provided in the image reading unit 3b. The read controller 31 is a circuit board for controlling the operation of the image reading unit 3b based on an instruction from the controller 1. An engine controller 50 is provided in the printing unit 5. The engine controller 50 is a circuit board for controlling the operation of the printing unit 5 based on an instruction from the controller 1. The document conveyance controller 30, the read controller 31, and the engine controller 50 include a CPU and a memory.

When the main power is turned on and electric power starts to be supplied to different portions, the power supply controller 9 resets the control circuit 10, the non-volatile memory 21, the volatile memory 22, and the reset targets in a prescribed order. When being reset (or reset-released), the control circuit 10, the non-volatile memory 21, the volatile memory 22, and the reset targets begin starting up. When the main power is turned on, as the power supply circuit 70 operates, the power supply controller 9 starts up first.

The power supply controller 9 resets, for example, the control circuit 10 first. The control circuit 10 reads a boot program from the non-volatile memory 21 and initializes hardware. With the boot program, the volatile memory 22 and the non-volatile memory 21 become usable. After start-up, the control circuit 10 sets the reset targets and establishes communication. When all the portions in the multifunction peripheral 100 complete starting up, the multifunction peripheral 100 becomes usable. After the main power is turned on, the multifunction peripheral 100 starts up in the normal mode.

In the multifunction peripheral 100, supply-stop portions are prescribed. The supply-stop portions are portions to which electric power is not supplied in the power saving mode. In the normal mode, the power supply controller 9 supplies electric power to the supply-stop portions as well. In the power saving mode, the power supply controller 9 does not supply electric power to the supply-stop portions. The power saving mode is a mode for reducing power consumption in the multifunction peripheral 100. The supply-stop portions are determined as necessary. For example, the controller 1, the storage unit 2, the document conveying unit 3a, the image reading unit 3b, the operation panel 4, the printing unit 5, the memory connecting unit 6 can be set as the supply-stop portions. The communication unit 12 and the power supply controller 9 are not included in the supply-stop portions.

When, in the normal mode, a prescribed shift condition is met, the control circuit 10 instructs the power supply controller 9 to shift the multifunction peripheral 100 to the power saving mode. The power supply controller 9, upon receiving a shift instruction, stops supplying power to the supply-stop portions in a predetermined order. A shift condition is, for example, operation of a power saving key 44. The power saving key 44 can be provided as a hardware key 43 on the operation panel 4 (see FIG. 3). The passage of a prescribed shift time (for example, several tens of seconds to several minutes) after shifting to the normal mode or with no input performed on the operation panel 4 may be taken as a shift condition. The operation panel 4 may accept the setting of the shift time. The controller 1 (control circuit 10) counts the power saving mode shift time.

On the other hand, in the power saving mode, no job can be performed. To perform a job, the multifunction peripheral 100 needs to be restored to the normal mode. Thus, when a prescribed condition for recovery to the normal mode is met, the power supply controller 9 makes the multifunction peripheral 100 recover to the normal mode. In the multifunction peripheral 100, input to or operation on the multifunction peripheral 100 in the power saving mode is a recovery condition.

Figure 3:
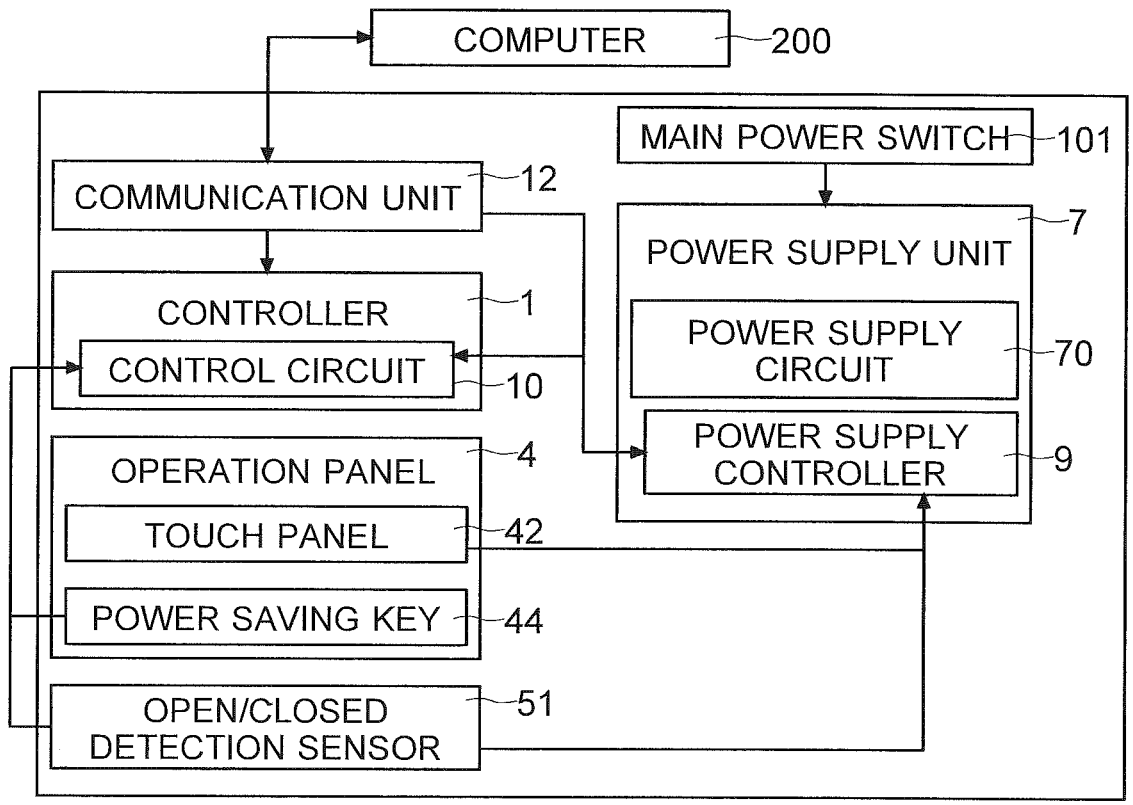
FIG. 3 is a diagram showing one example of the electric power supply system in the multifunction peripheral according to the embodiment.
Figure 4:
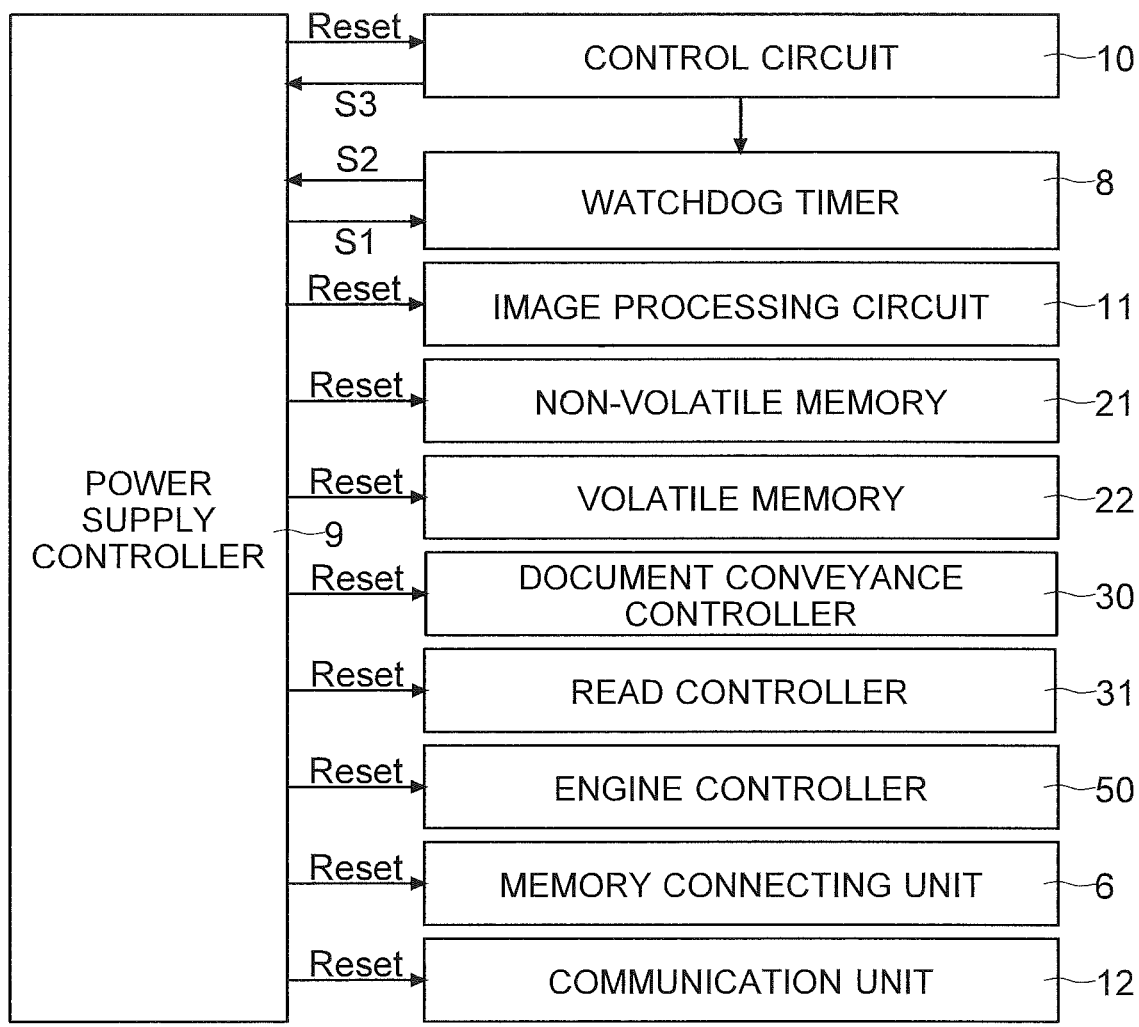
FIG. 4 is a diagram showing one example of starting-up in the multifunction peripheral according to the embodiment.

As shown in FIG. 3, the multifunction peripheral 100 includes the communication unit 12, a touch panel 42, and an open/closed detection sensor 51. The open/closed detection sensor 51 is a sensor for sensing operation on a part which is opened and closed by a user's operation. Such opened/closed portions include the document conveying unit 3a and the sheet cassette. The power supply controller 9, even in the power saving mode, supplies power to the communication unit 12, the touch panel 42, and the open/closed detection sensor 51.

The recovery condition can be prescribed. For example, receiving printing data can be taken as a recovery condition. When the communication unit 12 receives printing data from the computer 200, the communication unit 12 sends an interrupt for recovery to the power supply controller 9. Operation on the touch panel 42 can be taken as a recovery condition. When the touch panel 42 is operated, the touch panel 42 sends an interrupt for recovery to the power supply controller 9. The opening/closing operation of the multifunction peripheral 100 can be taken as a recovery condition. When opening/closing operation is sensed, the open/closed detection sensor 51 sends an interrupt to the power supply controller 9.

For recovery to the normal mode, the power supply controller 9 restarts to supply electric power to the supply-stop portions. The power supply controller 9 restarts to supply electric power to the supply-stop portions in a prescribed order. The power supply controller 9 resets the control circuit 10, the non-volatile memory 21, the volatile memory 22, and the reset targets in a prescribed order. The multifunction peripheral 100 recovers to the normal mode.

<Watchdog Timer 8>

Next, with reference to FIG. 5, one example of a procedure in the watchdog timer 8 according to the embodiment will be described. The watchdog timer 8 senses that the operation of the control circuit 10 is in a halt state due to a fault. The initial count value of the watchdog timer 8 is a value corresponding to a prescribed period. The period is determined as necessary. A clock signal is input to the watchdog timer 8. For example, a clock signal generated by a clock generation circuit (unillustrated) provided in the controller 1 is input to the watchdog timer 8. Every time the clock signal is input, the watchdog timer 8 decrements the count value.

Figure 5:
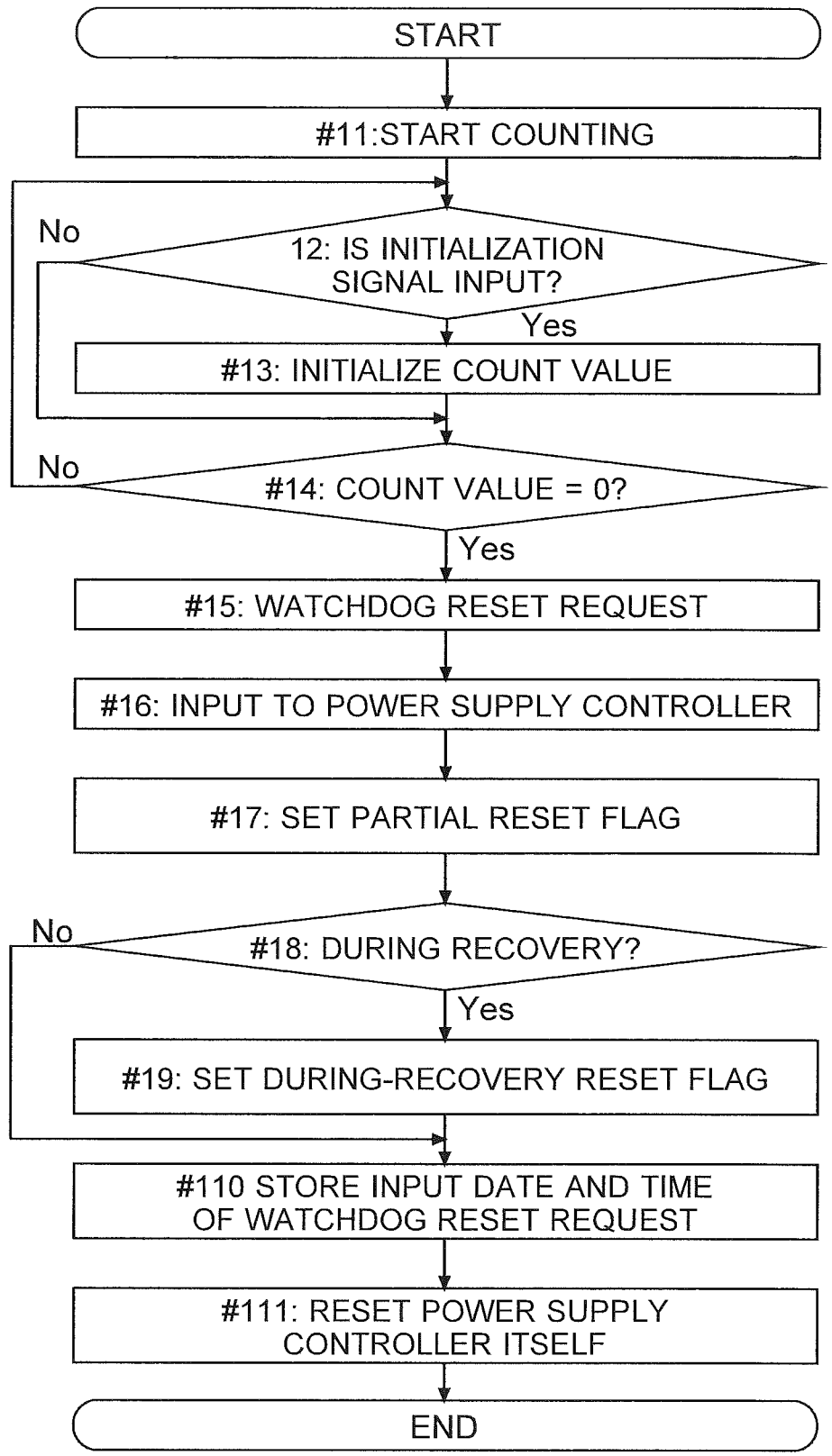
FIG. 5 is a diagram showing one example of a procedure in a watchdog timer according to the embodiment.

START in FIG. 5 is the time point when the controller 1 (control circuit 10) starts up, and the control circuit 10 inputs a timer start request to the watchdog timer 8. Based on the timer start request, the watchdog timer 8 starts time counting (decrementing) (step #11).

In normal operation, the control circuit 10 inputs an initialization signal S1 to the watchdog timer 8 at a period shorter than the prescribed period. When the initialization signal S1 is input (Yes in step #12), the watchdog timer 8 restores the count value to the initial value (step #13). When the initialization signal S1 is not input (No in step #12), the watchdog timer 8 checks whether the count value has become zero (step #14). Until the initialization signal S1 is input, every time the clock signal is input, the watchdog timer 8 decrements the count value by one.

When the count value is not zero (No in step #14), the procedure returns to step #12. When the count value is zero (Yes in step #14), the watchdog timer 8 outputs a watchdog reset request S2 (step #15). In other words, when the control circuit 10 is in a fault-induced halt state, the watchdog timer 8 outputs a reset request. The watchdog reset request S2 is input to the power supply controller 9 (step #16). Then, the power supply controller 9 sets a partial reset flag in the non-volatile memory 21 (step #17). The power supply controller 9 makes the data of the partial reset flag equal to the value it has when set.

Moreover, the power supply controller 9 checks whether the watchdog reset request S2 is made during the recovery from the power saving mode to the normal mode (step #18). When the watchdog reset request S2 is made during the recovery (Yes in step #18), the power supply controller 9 sets a during-recovery reset flag (step #19). The control circuit 10 makes the data of the during-recovery reset flag equal to the value it has when set. When the watchdog reset request S2 is not made during the recovery (No in step #18), step #19 is skipped. Furthermore, the power supply controller 9 makes the non-volatile memory 21 store the input date and time of the watchdog reset request S2 (step #110). The power supply controller 9 resets the power supply controller 9 itself (step #111). Then, the power supply controller 9 restarts, and the procedure ends (END).

<Procedure for Resetting Power Supply Controller 9>

Figure 6:
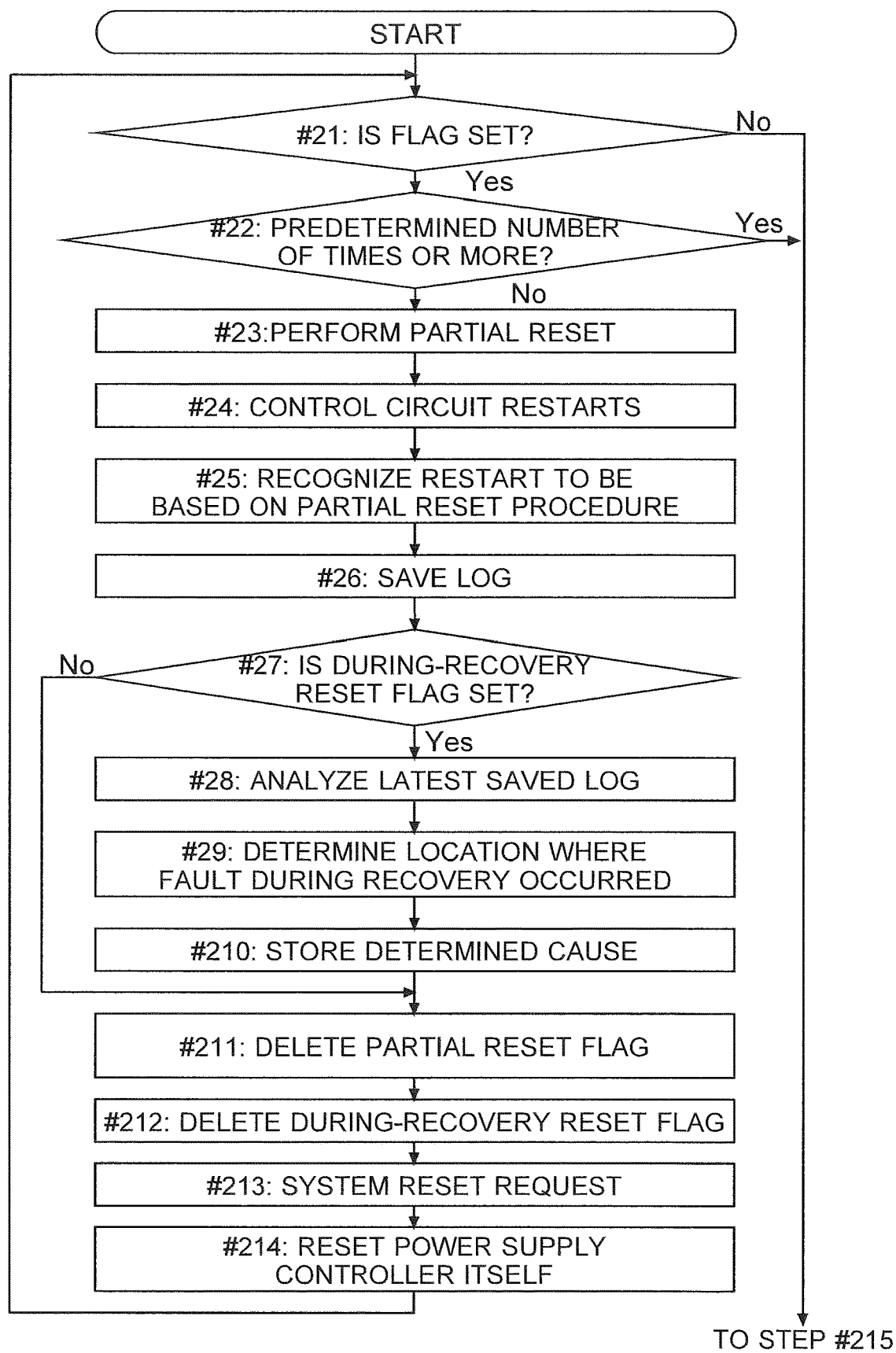
FIG. 6 is a diagram showing one example of a procedure in response to a reset request in the multifunction peripheral according to the embodiment.
Figure 7:
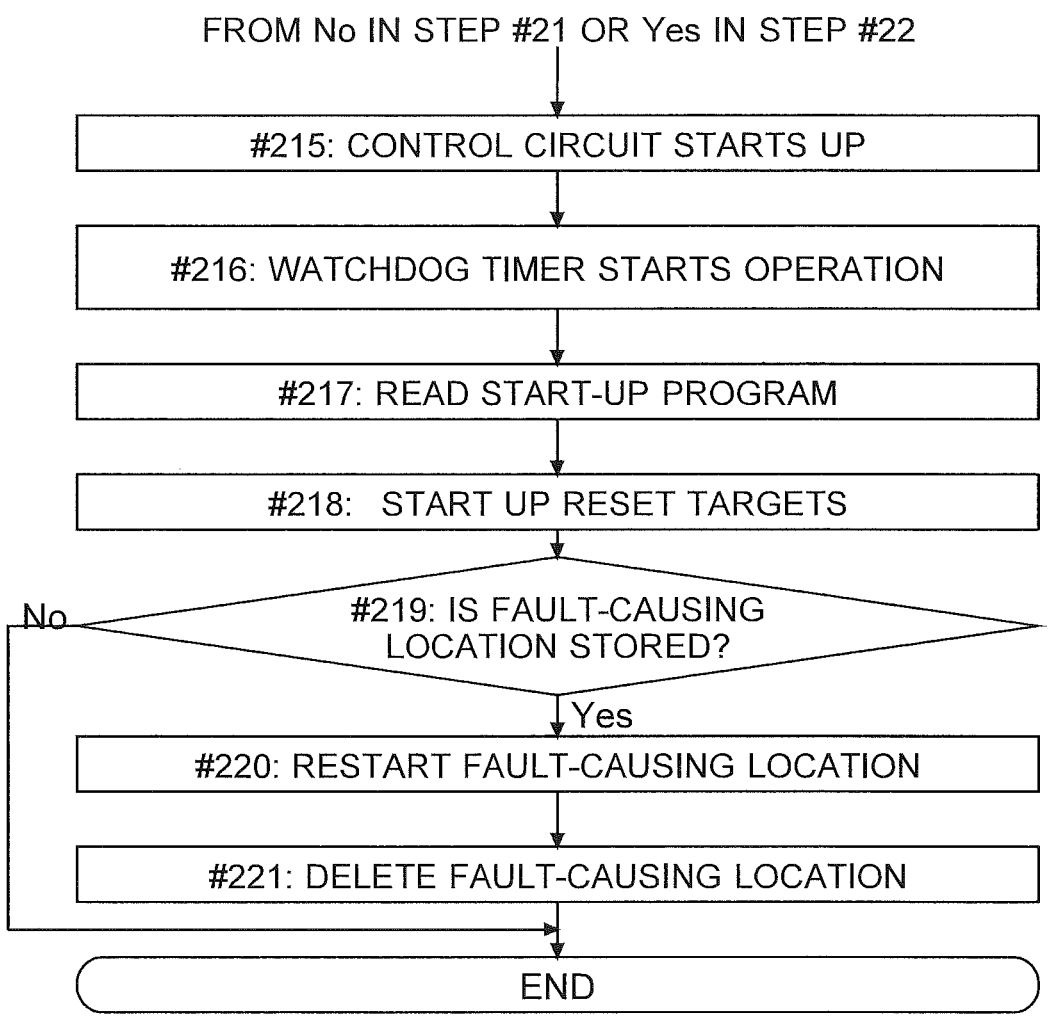
FIG. 7 is a diagram showing one example of a procedure in response to the reset request in the multifunction peripheral according to the embodiment.

Next, with reference to FIGS. 6 and 7, one example of a procedure during the reset request in the multifunction peripheral 100 according to the embodiment will be described. In the multifunction peripheral 100, two kinds of reset requests are input to the power supply controller 9. One is the watchdog reset request S2 mentioned above. The other is a system reset request S3. When the system reset request S3 is input, the power supply controller 9 does not set the partial reset flag. START in FIG. 6 is the time point when the power supply controller 9 starts. When the main power is turned on by the main power switch 101, the power supply controller 9 starts up. Also when the watchdog reset request S2 is input, the power supply controller 9 starts up. Likewise also when the system reset request S3 is input, the power supply controller 9 starts up.

First, the power supply controller 9 checks whether the partial reset flag is set (step #21). In other words, the power supply controller 9 checks whether the reset is based on the watchdog reset request S2. When the partial reset flag is set (Yes in step #21), the power supply controller 9 checks whether the watchdog reset request S2 is made a predetermined number of times or more during a prescribed period (step #22). For example, the period can be any time period between several minutes to several hours. The predetermined number of times can also be determined as necessary. The predetermined number of times can be set at a number larger than one.

When the watchdog reset request S2 is not made the predetermined number of times or more in the period (No in step #22), the power supply controller 9 performs a partial reset (step #23). A configuration is also possible where, instead of step #22 being performed, an advance is always made to step #23 when the partial reset flag is set (Yes in step #21). A partial reset is a procedure to reset only the control circuit 10. The power supply controller 9 does not reset (restart) the image processing circuit 11, the non-volatile memory 21, the volatile memory 22, the document conveyance controller 30, the read controller 31, the engine controller 50, the memory connecting unit 6, and the communication unit 12.

With the control circuit 10 reset alone, the control circuit 10 restarts (step #24). Specifically, the control circuit 10 reads a boot program from the non-volatile memory 21. As a result, the control circuit 10 starts up. During start-up, the control circuit 10 checks whether a partial reset flag is set. The control circuit 10 recognizes that the restart is performed based on the partial reset procedure (watchdog reset request S2) (step #25). The control circuit 10 makes the non-volatile memory 21 store a log of the stored contents of the volatile memory 22 (step #26).

The control circuit 10 copies, out of the stored contents of the volatile memory 22, either a region where the operation history is stored or a region where the current status is stored, or both of them. The control circuit 10 makes the non-volatile memory 21 store a log of the copied contents. For example, the control circuit 10 can store a log of global variables related to operation. For example, a log of a global variable indicating the number of interrupts may be stored. Or, a log of the kind of the processing program and the address of the position in a program currently being processed can be stored. The control circuit 10 can store a log of a stack region (stack memory) for a task.

As explained in the paragraph 0045, When the partial reset flag is set and the process always proceeds to step #23 skipping step #22, the control circuit 10 may check whether the watchdog reset request S2 is made the predetermined number of times or more in a prescribed period. The control circuit 10 checks the input date and time of the watchdog reset request S2. When the watchdog reset request S2 is made the predetermined number of times or more in the period, the control circuit 10 can change, out of the stored contents of the volatile memory 22, the part stored as a log, every time partial reset processing is performed. For example, the non-volatile memory 21 stores data that defines the region (address) to be stored according to the number of times the reset request is made in the period. The control circuit 10, based on the data, changes the part to be stored as a log.

The operation panel 4 accepts log saving operation. When saving operation is performed, the control circuit 10 makes the memory connecting unit 6 store in (copy to) a portable storage device a log of the non-volatile memory 21. The control circuit 10 can delete the log, after storing it in (copying to) the portable storage device, from the non-volatile memory 21.

The control circuit 10 checks whether the during-recovery reset flag is set (step #27). When the during-recovery reset flag is set (Yes in step #27), the control circuit 10 analyzes the latest stored log (step #28). Then, the control circuit 10 determines the location where a fault during the recovery has occurred (step #29). Then, the control circuit 10 makes the non-volatile memory 21 store the determined fault-causing location (step #210).

The control circuit 10 can check the values of global variables to determine the part of hardware corresponding to the global variable with an abnormal value as a fault-causing location. In that case, the non-volatile memory 21 may be made to store data that determines the range of the normal value for each global variable and data that determines the part of hardware corresponding to the global variable. The control circuit 10 may determine the fault-causing location by referring to this data.

Or, for example, the control circuit 10 can check data in the stack region for a task included in a log. In that case, the control circuit 10, based on data in the stack region, recognizes the procedure that was to be performed at the time of a fault-induced halt. The control circuit 10 checks which part the procedure at the time of the fault-induced halt tried to start. The control circuit 10 determines that the location corresponding to the procedure at the time of the fault-induced halt is the fault-causing location. For example, When the control circuit 10 stops during the procedure for establishing communication (initializing communication) between the control circuit 10 and the memory connecting unit 6, the control circuit 10 determines that the memory connecting unit 6 is the fault-causing location.

When the during-recovery reset flag is not set (No in step #27) or after the fault-causing location is determined (step #210), the control circuit 10 deletes the partial reset flag (step #211). The control circuit 10 makes the data of the partial reset flag equal to the value it has when not set. When the during-recovery reset flag is set, the control circuit 10 deletes the during-recovery reset flag (step #212). The control circuit 10 makes the data of the during-recovery reset flag equal to the value it has when not set.

Then, the control circuit 10 inputs (transmits) the system reset request S3 to the power supply controller 9 (step #213). When the system reset request S3 is input, the power supply controller 9 resets the power supply controller 9 itself (step #214). With this, the power supply controller 9 then restarts. The procedure returns to step #21. Back in step #21, the partial reset flag has been deleted, and thus step #21 yields No.

When the partial reset flag is not set (when the system reset request S3 is received; No in step #21), or the watchdog reset request S2 is made a predetermined number of times or more during the period (Yes in step #22), the power supply controller 9 performs a system reset. The system reset is processing for resetting the control circuit 10, the non-volatile memory 21, the volatile memory 22, and the reset targets.

To reset the system, the control circuit 10 first reads a boot program from the non-volatile memory 21. The control circuit 10 performs the boot program. For example, the control circuit 10 makes the power supply controller 9 reset the non-volatile memory 21 and the volatile memory 22. The control circuit 10 initializes the non-volatile memory 21 and the volatile memory 22. With this, the non-volatile memory 21 and the volatile memory 22 become usable. Then, the control circuit 10 completes starting up (step #215).

Started up, the control circuit 10 inputs the count starting request to the watchdog timer 8 (makes the watchdog timer 8 start operation, step #216). Thereafter, the control circuit 10 periodically inputs the initialization signal S1 to the watchdog timer 8. Next, the control circuit 10 reads a start-up program from the non-volatile memory 21 into the volatile memory 22 (step #217).

In the start-up program, the order of resetting the reset targets is defined. In resetting, the reset targets initialize relevant hardware. In the start-up program, a procedure for establishing communication with the initialized reset targets (hardware) is defined. The control circuit 10, based on the start-up program, makes the reset targets start up (step #218). For example, the control circuit 10 makes the power supply controller 9 reset the reset targets sequentially. In addition, the control circuit 10 establishes communication with each reset target.

The control circuit 10 checks whether a fault-causing location is stored in the non-volatile memory 21 (step #219). When a fault-causing location is stored (Yes in step #219), the control circuit 10 makes the fault-causing location to restart (step #220). For example, When the memory connecting unit 6 is the fault-causing location, the control circuit 10 makes the power supply controller 9 reset the memory connecting unit 6. The control circuit 10 makes the memory connecting unit 6 initialize hardware. In addition, the control circuit 10 establishes communication with the memory connecting unit 6. It is possible to make the memory connecting unit 6 do once again the processing in which the fault has occurred.

After the restart of the fault-causing location, the control circuit 10 makes the non-volatile memory 21 delete the data of the fault-causing location (step #221). When no fault-causing location is stored (No in step #219), or after step #221, the procedure ends (END).

As described above, the image forming apparatus (multifunction peripheral 100) according to the embodiment includes the printing unit 5, the watchdog timer 8, the control circuit 10, the non-volatile memory 21, the volatile memory 22, and the power supply controller 9. The printing unit 5 performs printing. When the initialization signal S1 for initialization is input in a prescribed period, the watchdog timer 8 resets the timer. When the initialization signal S1 is not input in the prescribed period, the watchdog timer 8 outputs the watchdog reset request S2. The control circuit 10 inputs the initialization signal S1 to the watchdog timer 8. In the non-volatile memory 21, programs are stored. Into the volatile memory 22, the programs are read. The power supply controller 9 controls the supply of electric power to the control circuit 10, the non-volatile memory 21, the volatile memory 22, and the reset targets. To restart, the power supply controller 9 resets the control circuit 10, the non-volatile memory 21, the volatile memory 22, and the reset targets. The power supply controller 9 is connected to the watchdog timer 8. When the watchdog reset request S2 is input, the power supply controller 9 performs partial reset processing in which the control circuit 10 alone is reset. When the control circuit 10 restarts by partial reset processing, the control circuit 10 makes the non-volatile memory 21 store a log of the stored contents of the volatile memory 22. After the log is stored, the control circuit 10 transmits the system reset request S3 to the power supply controller 9. When the system reset request S3 is received, the power supply controller 9 resets all of the control circuit 10, the non-volatile memory 21, the volatile memory 22, and the reset targets.

With this configuration, the control circuit 10 with a fault (in a halt state) alone can be reset (restarted). The control circuit 10 can be recovered preliminarily (temporarily). Stored contents in the volatile memory 22 can be read. Data for analyzing the cause of the fault can be stored. By reading the log recorded (collected) in the non-volatile memory 21, the cause of the fault can be analyzed. After the log is stored and collected, the entire system can be reset. The image forming apparatus can be restored to a usable state automatically.

When the watchdog reset request S2 is input, the power supply controller 9 sets the partial reset flag in the non-volatile memory 21. The control circuit 10 checks, when starting up, whether the partial reset flag is set in the non-volatile memory 21. The control circuit 10, When the partial reset flag is set, makes the non-volatile memory 21 store as a log, out of the data of the volatile memory 22, either the data of the operation history or the data indicating the current status, or both of them. After the log is stored, before the system reset request S3 is transmitted, the control circuit 10 deletes the partial reset flag. When the partial reset flag is not set in the non-volatile memory 21, the power supply controller 9 resets all of the control circuit 10, the non-volatile memory 21, the volatile memory 22, and the reset targets. Only when a reset based on partial reset processing is performed, it is possible to store the contents of the volatile memory 22 as a log. It is possible not to store a log in the non-volatile memory 21 When a reset is not based on a fault.

In the power saving mode, the power supply controller 9 stops supplying electric power to the prescribed supply-stop portions. In the normal mode, the power supply controller 9 supplies electric power to the supply-stop portions as well. During the recovery from the power saving mode to the normal mode, when the watchdog reset request S2 is input, the control circuit 10 analyzes a log stored in the non-volatile memory 21 during the restart by partial reset processing. Based on the analyzed log, the control circuit 10 determines the location where a fault during the recovery has occurred. The control circuit 10 makes the non-volatile memory 21 store the determined fault-causing location. It is possible to make the non-volatile memory 21 store the analysis result of the fault-causing location. It is possible to record information for analyzing a fault that has occurred during the switch from the power saving mode to the normal mode.

When the restart is performed based on the system reset request S3, the control circuit 10 checks whether a fault-causing location is stored in the non-volatile memory 21. When a fault-causing location is stored, the control circuit 10 makes the fault-causing location restart. After the entire system is restarted, start-up of the fault-causing location can be performed once again automatically.

During the recovery from the power saving mode to the normal mode, When the watchdog reset request S2 is made, the power supply controller 9 sets the during-recovery reset flag in the non-volatile memory 21. The control circuit 10, When the during-recovery reset flag is set, analyzes the log and determines the location where a fault has occurred during the recovery. Before the system reset request S3 is transmitted, the during-recovery reset flag is deleted. The record that the watchdog reset request S2 has been made during the recovery (during-recovery reset flag) can be kept.

The power supply controller 9 makes the non-volatile memory 21 store the input date and time of the watchdog reset request S2. When the watchdog reset request S2 is made the predetermined number of times or more in a prescribed period, the control circuit 10 can change, out of the stored contents of the volatile memory 22, the part stored as a log every time partial reset processing is performed. When the watchdog reset request S2 is made frequently, it is possible to change, out of the stored contents of the volatile memory 22, the contents (address) to be recorded as a log.

When the watchdog reset request S2 is made a predetermined number of times or more during the prescribed period, the power supply controller 9 does not perform partial reset processing, and resets all of the control circuit 10, the non-volatile memory 21, the volatile memory 22, and the reset targets. It is possible not to record a log When the watchdog reset request S2 is made frequently. It is possible to prevent a capacity shortage of the non-volatile memory 21 due to a large number of logs.

The multifunction peripheral 100 includes the memory connecting unit 6 for connecting to a portable storage device. The control circuit 10 makes the portable storage device connected to the memory connecting unit 6 store a log. It is possible to extract the log from the non-volatile memory 21 to the portable storage device. Based on the log written in the portable storage device, the cause of a fault can be analyzed in detail.

The embodiment described above is in no way meant to limit the present disclosure, which thus allows for many modifications and variations within the spirit of the present disclosure.

What is claimed is:

1. An image forming apparatus, comprising:
a printing unit which performs printing;
a watchdog timer which resets a timer when an initialization signal for initialization is input in a prescribed period and which outputs a watchdog reset request when the initialization signal is not input in the prescribed period;
a control circuit which inputs the initialization signal to the watchdog timer;
a non-volatile memory which stores a program;
a volatile memory to which the program is read; and
a power supply controller which controls supply of electric power to the control circuit, the non-volatile memory, the volatile memory, and reset targets and which, in restarting, resets the control circuit, the non-volatile memory, the volatile memory, and the reset targets,
wherein
the power supply controller is connected to the watchdog timer,
when the watchdog reset request is input, the power supply controller performs partial reset processing in which the control circuit alone is reset,
when the control circuit is restarted by the partial reset processing, the control circuit makes the non-volatile memory store a log of stored contents of the volatile memory,
after the log is stored, the control circuit transmits a system reset request to the power supply controller, and
when the power supply controller receives the system reset request, the power supply controller resets the control circuit, the non-volatile memory, the volatile memory, and the reset targets.

2. The image forming apparatus according to claim 1, wherein
when the watchdog reset request is input, the power supply controller sets a partial reset flag in the non-volatile memory,
when the control circuit starts up, the control circuit checks whether the partial reset flag is set in the non-volatile memory,
when the partial reset flag is set, the control circuit makes the non-volatile memory store as the log, out of data of the volatile memory, either or both of the data of an operation history and the data indicating a current status,
after the log is stored, before the system request is transmitted, the control circuit deletes the partial reset flag, and
when the partial reset flag is not set in the non-volatile memory, the power supply controller resets all of the control circuit, the non-volatile memory, the volatile memory, and the reset targets.

3. The image forming apparatus according to claim 1, wherein in a power saving mode, the power supply controller stops supplying electric power to prescribed supply-stop portions, in a normal mode, the power supply controller supplies electric power to the supply-stop portions, and when the watchdog reset request is made during recovery from the power saving mode to the normal mode, the control circuit analyzes the log stored in the non-volatile memory when restarted by the partial reset processing, determines a fault-causing location during the recovery based on an analysis of the log, and makes the non-volatile memory store the determined fault-causing location.

4. The image forming apparatus according to claim 3, wherein when restarting is performed based on the system reset request, the control circuit checks whether the fault-causing location is stored in the non-volatile memory, and when the fault-causing location is stored, the control circuit makes the fault-causing location restart.

5. The image forming apparatus according to claim 3, wherein when the watchdog reset request is made during the recovery from the power saving mode to the normal mode, the power supply controller sets a during-recovery reset flag in the non-volatile memory, when the during-recovery reset flag is set, the control circuit analyzes the log and determines the fault-causing location during the recovery, and before the system reset request is transmitted, the control circuit deletes the during-recovery reset flag.

6. The image forming apparatus according to claim 1, wherein the power supply controller makes the non-volatile memory store an input date and time of the watchdog reset request, and when the watchdog reset request is made a predetermined number of times or more during a prescribed period, the control circuit changes, out of the stored contents of the volatile memory, the part stored as the log every time the partial reset processing is performed.

7. The image forming apparatus according to claim 1, wherein the power supply controller makes the non-volatile memory store an input date and time of the watchdog reset request, and when the watchdog reset request is made a predetermined number of times or more during a prescribed period, the power supply controller does not perform the partial reset processing, and resets all of the control circuit, the non-volatile memory, the volatile memory, and the reset targets.

8. The image forming apparatus according to claim 1, further comprising a memory connecting unit for connecting to a portable storage device, wherein the control circuit makes the portable storage device connected to the memory connecting unit store the log.

9. A method for controlling an image forming apparatus, the method comprising:

inputting an initialization signal to a watchdog timer;

resetting the watchdog timer when the initialization signal is input in a prescribed period;

outputting an watchdog reset request when the initialization signal is not input in the prescribed period;

controlling supply of electric power to a control circuit, a non-volatile memory, a volatile memory, and reset targets;

resetting the control circuit, the non-volatile memory, the volatile memory, and the reset targets during restarting;

performing partial reset processing in which the control circuit alone is reset when the watchdog reset request is input;

making the non-volatile memory store a log of stored contents of the volatile memory when the control circuit is restarted by the partial reset processing;

transmitting a system reset request after the log is stored; and resetting the control circuit, the non-volatile memory, the volatile memory, and the reset targets based on the system reset request.

* * * * *